(12) United States Patent
Bowers

(10) Patent No.: US 11,053,004 B2
(45) Date of Patent: Jul. 6, 2021

(54) AERODYNAMIC DRONE USING AIRFOIL-DESIGNED FUSELAGES AND ASSOCIATED PARTS

(71) Applicant: Periscope Aviation, LLC, McLean, VA (US)

(72) Inventor: Nicholas Bowers, Fontana, WI (US)

(73) Assignee: Periscope Aviation, LLC, McLean, VA (US)

(*) Notice: Subject to any disclaimer, the term of this patent is extended or adjusted under 35 U.S.C. 154(b) by 312 days.

(21) Appl. No.: 15/987,512

(22) Filed: May 23, 2018

(65) Prior Publication Data

US 2019/0112047 A1    Apr. 18, 2019

Related U.S. Application Data

(60) Provisional application No. 62/573,603, filed on Oct. 17, 2017.

(51) Int. Cl.
| | |
|---|---|
| *B64C 39/02* | (2006.01) |
| *B64C 1/00* | (2006.01) |
| *B64D 27/26* | (2006.01) |

(52) U.S. Cl.
CPC .......... *B64C 39/024* (2013.01); *B64C 1/0009* (2013.01); *B64D 27/26* (2013.01); *B64C 2201/021* (2013.01); *B64C 2201/024* (2013.01); *B64C 2201/027* (2013.01); *B64C 2201/042* (2013.01); *B64C 2201/108* (2013.01)

(58) Field of Classification Search
CPC ..... B64C 39/024; B64C 1/1009; B64D 27/08; B64D 27/26
See application file for complete search history.

(56) References Cited

U.S. PATENT DOCUMENTS

| | | | | |
|---|---|---|---|---|
| 6,655,631 | B2* | 12/2003 | Austen-Brown | B64C 27/28 244/12.4 |
| 9,187,174 | B2* | 11/2015 | Shaw | B64C 27/28 |
| 9,567,079 | B2* | 2/2017 | Johnson | B64C 25/32 |
| 10,315,761 | B2* | 6/2019 | McCullough | B64C 11/28 |
| 10,343,773 | B1* | 7/2019 | McCullough | B64C 39/024 |
| 10,392,104 | B1* | 8/2019 | Urban | B64C 11/28 |
| 10,501,193 | B2* | 12/2019 | Oldroyd | B64C 29/02 |
| 10,618,656 | B2* | 4/2020 | Campbell | B64C 29/0033 |
| 2011/0001020 | A1* | 1/2011 | Forgac | B64C 39/024 244/7 A |
| 2014/0097290 | A1* | 4/2014 | Leng | B64D 17/00 244/6 |
| 2014/0217229 | A1* | 8/2014 | Chan | B64C 39/024 244/6 |
| 2016/0114887 | A1* | 4/2016 | Zhou | B64C 39/024 348/148 |

(Continued)

*Primary Examiner* — Michael H Wang
(74) *Attorney, Agent, or Firm* — Clyde Findley; Eric Hanscom

(57) ABSTRACT

This invention is directed toward an aerodynamically designed drone with a unique angle of propulsion. The drone uses airfoil design to move more efficiently through the air, and the aerodynamic design is optimized when the drone is tilted forward at various degrees of "tilt" to provide the most aerodynamic profile to the oncoming air. The invention contemplates single hull, double hull and triple hull designs, and is applicable to heaving lifting drones, drones use for photography and remote sensing, and racing drones.

1 Claim, 13 Drawing Sheets

(56) References Cited

U.S. PATENT DOCUMENTS

| | | | | |
|---|---|---|---|---|
| 2016/0144957 A1* | 5/2016 | Claridge | ............... | B64C 29/02 |
| | | | | 244/6 |
| 2016/0207625 A1* | 7/2016 | Judas | ................... | B64C 27/473 |
| 2016/0229534 A1* | 8/2016 | Hutson | ................... | B64C 27/08 |
| 2016/0272313 A1* | 9/2016 | Chan | ...................... | B64C 27/08 |
| 2017/0043869 A1* | 2/2017 | Howard | ............... | B64C 27/006 |
| 2017/0101174 A1* | 4/2017 | Ou | ....................... | B64C 39/024 |
| 2017/0300066 A1* | 10/2017 | Douglas | .............. | G05D 1/0858 |
| 2017/0327220 A1* | 11/2017 | Hu | ......................... | B64C 27/08 |
| 2018/0186448 A1* | 7/2018 | Pantalone | ............ | B64C 27/463 |
| 2018/0208301 A1* | 7/2018 | Ye | ......................... | B64D 35/02 |
| 2018/0297711 A1* | 10/2018 | Oldroyd | ................. | B64C 27/52 |
| 2018/0297712 A1* | 10/2018 | Oldroyd | ................. | G05D 3/00 |
| 2019/0009895 A1* | 1/2019 | Tu | ........................... | B64C 27/82 |
| 2019/0071174 A1* | 3/2019 | Burigo | ................... | B64D 27/24 |
| 2019/0135424 A1* | 5/2019 | Baity | .................... | B64C 39/024 |
| 2020/0010182 A1* | 1/2020 | Renteria | ............... | A63H 27/12 |
| 2020/0023829 A1* | 1/2020 | Hefner | ................... | B64C 29/02 |
| 2020/0130803 A1* | 4/2020 | Xiao | ....................... | B64C 1/30 |

* cited by examiner

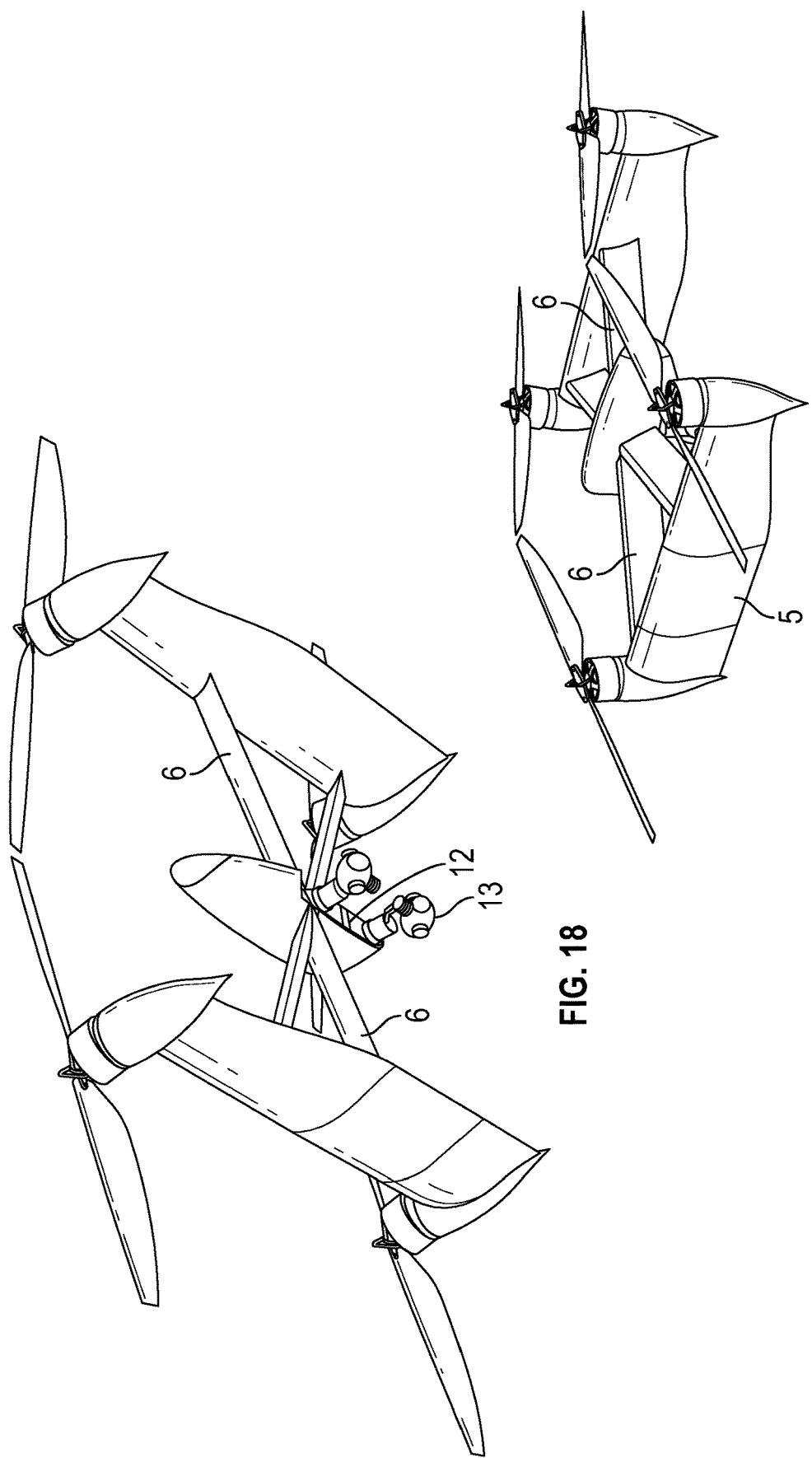

AERODYNAMIC DRONE USING AIRFOIL-DESIGNED FUSELAGES AND ASSOCIATED PARTS

CROSS REFERENCE TO RELATED APPLICATIONS

This Utility patent application claims priority to U.S. Provisional No. 62/573,603 filed Oct. 17, 2017, the contents of which are incorporated by reference.

STATEMENT REGARDING FEDERALLY SPONSORED RESEARCH OR DEVELOPMENT

This invention was not federally sponsored.

BACKGROUND OF THE INVENTION

Field of the invention: This invention relates to the general field of unmanned aerial vehicles, also known as "drones", and more specifically to an aerodynamically designed drone with one or more fuselages and attached items such as support arm, motor mounts and propeller supports that achieve an aerodynamic optimum performance when the drone is flown forward at a particular angle of propulsion.

Drones have become a highly prominent product over the last five years. While the technology of using propellers to lift an object off the ground has been around in the prior art for decades, it was the miniaturization that accompanied cell phone development that allowed for drone bodies to be light enough for the drone to achieve enough flight time to be useful.

Coinciding with the advancements of drone technology, the size, shape, and uses of drones has also grown very quickly. While five years ago, the majority of drones were small drones, under 5 pounds, that were used for aerial photography, today there are drones of all sizes, ranging from tiny micro-drones that you can buy for $10 online, to much heavier and more sophisticated drones that are used for building and agricultural inspection, and even carrying full size movies cameras to provide aerial video for use in movies, which can cost upwards of $100,000. While many drones retain the initial "quadcopter" shape, with four propellers, hexa-copters and octo-copters are very popular with the larger drones, and even tri-copter drones are known in the prior art. In terms of uses, while the first Phantom 1's and Phantom 2's were developed for aerial photography, today drones are also used for agricultural inspections, surveillance, remote sensing, package delivery, first aid delivery, racing tournaments, and even human transport.

As drones evolve though, the basic parts of the drone and the attendant problems remain the same. A drone is basically a flying minicomputer, where the flight time is determined by the battery, the weight of the drone, the weight of the payload (camera, sensor, package), and how fast the drone flies. The time up in the air, however, is not a true measure of how effective the drone is performing. So, which the "total air time" of a drone used for photography may be 20 minutes, if only half of that time, or 10 minutes, is actually spent shooting stills and videos, the "effective flight time" is only 50% of the total air time. Let's look at DJI's Phantom line of drones for a further illustration of why increasing the "effective flight time" even a little bit can drastically improve the efficiency of a drone.

The Phantom 2, which was the drone that really got the drone revolution going, was released in December of 2013 and had a battery life of around 15 minutes. The Phantom 4 was released in early 2016 and has a battery life of around 25 minutes.

So, let's take a look at how efficient the two drones are. The example we will take is a drone operator who shoots houses for realtors. The dronist inserts a new battery into the drone and toggles the switches to turn the propellers on. Safe practices require the dronist to fly the drone up between 6 and 10 feet, then check to make sure the WIFI connection remains stable, and to gently test out the eight possible directions of flight (up, down, pan right, pan left, forwards, backwards, yaw right, yaw left). That takes approximate 1 minutes (14 minutes left). Then the dronist has to fly into position to take the shots. This takes, let's say, 4 minutes (10 minutes left). Since the dronist wants a minimum of 5 minutes to safely bring the drone back to "home" and to land it safely with enough reserve battery left just in case something goes wrong, that leave 5 minutes for "effective flight time". Thus, with a Phantom 2, the dronist gets 5 "effective flight time" minutes out of 15 "total air time" minutes, or a 33% efficiency.

So, let's compare the Phantom 2's 33% efficiency rate against the Phantom 4. With the Phantom 4, we have 25 minutes of total air time. As with the Phantom 2, we lose 5 minutes making sure the drone is under control, and we still need 5 minutes of time at the end of the flight to get the drone back safely, but in the middle now, we have 15 minutes of "effective flight time", for a 60% efficiency. So, by adding 10 minutes to the battery life, DJI has increased the efficiency of its drones from 33% to 60%.

Thus, it is highly desirable to increase the amount of time a drone stays in the air. The prior art shows a number of different approaches to this challenge. Battery technology continues to improve with lighter and lighter batteries that hold more and more power. Propeller designs are also evolving such that the drones take less power to achieve the same amount of speed. Many manufacturers are also working on making the drone bodies and the payloads lighter and lighter.

While the technological improvements are very beneficial to making drones efficient, there is a lack of work on making the drone itself fly more efficiently. What if the dronist in our previous example could cover twice the distance because his/her drone flew faster for the same amount of battery drain? Let's take the Phantom 2 (15 minutes total air time, 5 minutes efficient flight time, 33% efficiency). What if the dronist could get the drone into position twice as fast, and only had to allow for a 3-minute safety margin that the end? 1-minute testing, 2 minutes into position, 3-minute buffer at the end; only 6 of the 15 minutes would be unproductive, leaving 9 of the 15 minutes as being effective flight time, for the same 60% efficiency that today's Phantom 4 achieves. Now, since the dronist's new drone flies faster than the Phantom, the dronist can cover more area that he/she could before, so that the footage obtained will be greater than that he/she could have shot with the older drone.

Therefore, it would be highly desirable to create a much more efficient drone that both wasted less energy maintaining a hovering position and moved through the air more efficiently that do the prior art drones. The current invention provides just such a solution by providing a drone that attacks this problem from two perspectives. First, it provides an aerodynamically design drone that relies on airfoil technology to move through the air more efficiently that does the prior art. Thus, when the drone is hovering, it will have to expend less energy "holding position" than would a traditional drone. Second, the invention recognizes that when a drone is moving forward, it "tilts" forward, such that the profile it presents while sitting on the ground is not the profile it presents while flying. The current invention takes advantage of this fact and aligns the aerodynamic shape of certain drones relying on certain airfoils for their design are shaped such that they achieve their maximum efficiency when the drone is tiled forward between 5 and 15 degrees, as is normally seen when a drone is flying forward.

OBJECTS OF THE INVENTION

It is therefore an object of the present invention to provide a drone that moves through the air more efficiently that the prior art drones.

Another object of the invention is to provide a drone with one or more aerodynamically-designed fuselages in which the battery(ies), payload, flight controllers, circuit board and other key components of the drone are stored.

It is yet another object of the invention to have an aerodynamically-designed drone which operates at maximum efficiency when the drone is tilted forward at between 0 and 90 degrees, with particularly preferred embodiments between 5 and 15 degrees.

STATEMENT OF THE INVENTION

Accordingly, one aspect the invention includes a single hull fuselage in which the key components of a drone are stored, with two or more arms that radiate out from the side and house three or more propellers.

An additional aspect of the invention includes a double hull fuselage, connected in a catamaran-like assembly, with three or more propellers arrayed on the fuselages, or one two or more arms that radiate out from the sides of the two fuselages.

An additional aspect of the invention includes a triple hull fuselage, connected in a trimaran-like assembly, with three or more propellers arrayed on the fuselages, or one two or more arms that radiate out from the sides of at least two of the three fuselages.

A further aspect of the invention includes the single-, double-, or triple-hulled version built very large such that that it can efficiently carry a large payload such as a person, package, movie camera or other large, heavy object.

A further aspect of the invention includes the single-, double-, or triple-hulled version built between 2 and 10 pounds such that that it can efficiently carry a medium payload such as a camera, remote sensing equipment or other moderately heavy item.

A further aspect of the invention includes the single-, double-, or triple-hulled version built very small that that it can efficiently carry a small payload such as a micro-camera or other very small and lightweight payload.

A further aspect of the invention includes the single-, double-, or triple-hulled version built very small with a small, lightweight battery that gives high power for a limited amount of time for use in drone racing.

An additional object of the invention is to provide a drone that hovers spending a minimum of battery power keeping position.

A further object of the invention is to provide a drone that can provide an improved efficiency over the prior both when the drone is hovering and when it is flying forward.

Another object of the invention is to provide a drone that has an improved aerodynamic design that will allow it to withstand severe wind and turbulence.

A final object of the invention is to provide a drone that realizes at least a 25% improvement in efficiency over the prior art in terms of hovering and flying against a substantial headwind.

There has thus been outlined, rather broadly, the more important features of the invention in order that the detailed description thereof may be better understood, and in order that the present contribution to the art may be better appreciated. There are additional features of the invention that will be described hereinafter and which will form the subject matter of the claims appended hereto. The features listed herein and other features, aspects and advantages of the present invention will become better understood with reference to the following description and appended claims. The accompanying drawings, which are incorporated in and constitute part of this specification, illustrate embodiments of the invention and, together with the description, serve to explain the principles of the invention.

It should be understood the while the preferred embodiments of the invention are described in some detail herein, the present disclosure is made by way of example only and that variations and changes thereto are possible without departing from the subject matter coming within the scope of the following claims, and a reasonable equivalency thereof, which claims I regard as my invention.

BRIEF DESCRIPTION OF THE FIGURES

Several preferred forms of the invention will now be described with reference to the accompanying drawings.

FIG. 18 is a bottom, perspective view of a drone with "X-shaped" connecting arms, enlarged propeller support arms, a payload cavity, and a payload.

FIG. 19 is a back, perspective view of the drone illustrated in FIG. 20 in a hovering position.

DETAILED DESCRIPTION OF THE FIGURES

Figure 1:
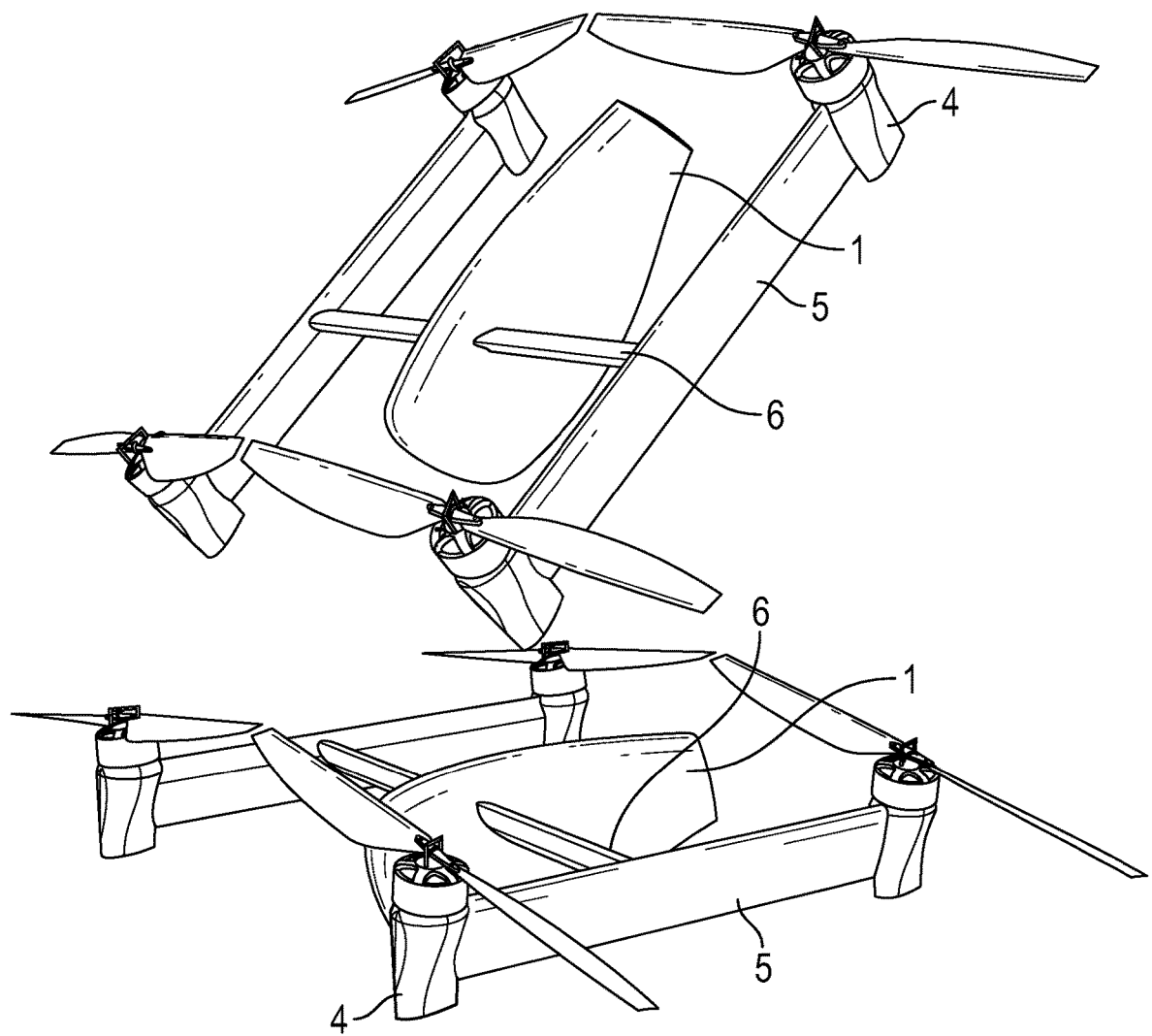
FIG. 1 is a perspective view of a drone with the basic components of the invention showing an embodiment of the drone designed to fly at its most efficient profile when tilted forward.

Many aspects of the invention can be better understood with references made to the drawings below. The components in the drawings are not necessarily drawn to scale. Instead, emphasis is placed upon clearly illustrating the components of the present invention. Moreover, like reference numerals designate corresponding parts through the several views in the drawings. Before explaining at least one embodiment of the invention, it is to be understood that the embodiments of the invention are not limited in their application to the details of construction and to the arrangement of the components set forth in the following description or illustrated in the drawings. The embodiments of the invention are capable of being practiced and carried out in various ways. In addition, the phraseology and terminology employed herein are for the purpose of description and should not be regarded as limiting.

FIG. 1 is a perspective view of a drone with the basic components of the invention showing an embodiment of the drone designed to fly at its most efficient profile when tilted forward. The drone shown in the upper part of this figure is the angle it achieves as it is flying; the drone shown in the lower part of the figure is "hovering". With drones, the operator generally flies the drone up into the air and "hovers" it in position before embarking on a "mission". As the drone hovers, its internal components cause it to maintain its position, such that if there is wind, the drone has to expend energy not only to stay at the height selected by the drone operator, but also to move "against" the wind to keep its horizontal position constant. Thus, the aerodynamic profile of a drone in a hovering, or flat position is important as the more aerodynamic the profile, the less energy the drone will have to expend fighting any wind currents.

Once the drone operator, or "dronist" begins a mission (such as flying over a house to be photographed, or gathering moisture data from a famer's field), the drone tilts forward and begins flying. To achieve the tilt, the front two motors rotate at a slightly lower rpm than do the back two motors, thereby "lifting" the back of the drone. As it flies, the propellers basically balance moving up and falling down such that the drone moves forward at a stable height. Thus, the aerodynamic profile of the drone when it is flying is even more important that the profile it presents when hovering, as generally the flying portion of a drone operation is more important than the hovering portion.

Like a traditional quadcopter or drone, the invention has a fuselage 1, one or more propellers 2 (most drones today have four propellers, but there are drones with fewer than four propellers, and some of the larger, commercial drones have six or eight propellers), a motor 3 to spin the propeller, a motor mount 4 that houses the motor, a propeller support arm 5 that houses the motor mounts, motors and propellers, and one or more connecting arms 6 the connect the propeller support arms 5 to the fuselage 1. A battery, not shown but traditionally inside the fuselage, is controlled through WIFI by an outside controller (also not shown in this figure), and powers the motors, which spin the propellers. The dronist (a person flying a drone) moves the drone with two toggles that control is rotation, elevation, and directions of flying. In this figure, the fuselage 1 is significantly "taller" and "thinner" than is the fuselage in a traditional drone. The presents a more efficient aerodynamic profile, so that when the drone is in a hovering position, it expends less battery power maintaining its position "fighting" any oncoming wind to maintain its position. However, the main advantage of this drone is that when moving forward, the drone "tilts" forward (upper figure) and presents an even more ideal aerodynamic profile against the air through which it moves. The propeller support arms 5 are also taller and thinner that traditional support arms, and the connecting arm 6 is small and thin, and both are design to present a minimum profile when the drone is flying forward. Rather than the round arms traditionally used in drones, the propeller support arms 5 and connecting arms 6 are designed more like airplane wings than like cylinders, resulting in a more aerodynamic drone.

Figure 2:
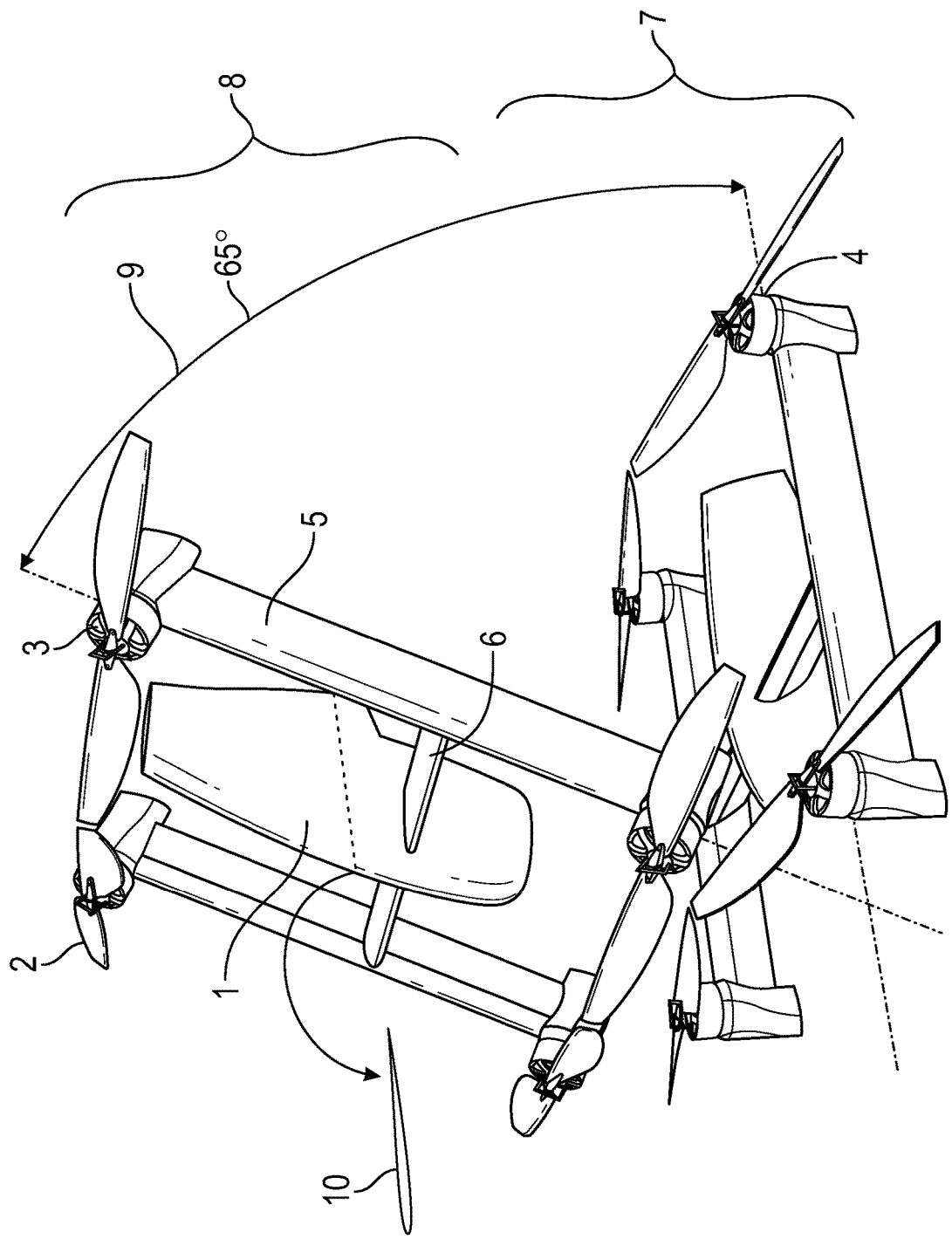
FIG. 2 is a perspective view of a drone with the basic components of the invention showing an embodiment of the drone designed to fly at its most efficient profile when tilted forward by 65 degrees.

FIG. 2 is a perspective view of a drone in both flying (above) and hovering (below) positions with the basic components of the invention showing an embodiment of the drone designed to fly at its most efficient profile when tilted forward by 65 degrees. An air resistance profile 10 can be created through computer mapping of the various surfaces of the drone in hovering 7 and moving 8 modes, from which an ideal degree of inclination 9 can be determined for each individual model of drone, depending on its shape and intended purpose. When the drone a hovering (generally reference number 7), all four propellers move at approximate the same revolutions per minute, as the goal is to keep the drone in a similar angle as if it were resting on the ground. To move a drone forward, the pilot normally presses forward on one of the toggles, which causes the leading two propellers to rotate slightly more slowly than before, so that the leading edge of the drone drops, and the trailing two propellers to rotate slightly more quickly than before, such that the trailing edge of the drone rises slightly. This creates a drone that looks as though it has "tipped forward" when it stops hovering 7 and begins to move 8. The amount of "tipping" can be controlled by the drone manufacturer, such that they can set the maximum "degree of inclination" 9.

A major improvement that this invention has made over the prior art is to anticipate the fact that a moving drone 8 presents a different profile to the air through which it moves than does a hovering drone 7, and to design the drone so that it presents the most efficient profile to the air when it is in a moving position 8 (while it is also important to present an aerodynamic profile when hovering, drones use proportionately more energy when moving through the air). The second major improvement made by this invention is to design the fuselage 1, connecting arms 6, propeller support arms 5 and even the motor mounts 4 using airfoil technology such that the drone expends a minimum amount of battery energy when moving forward.

Figure 3:
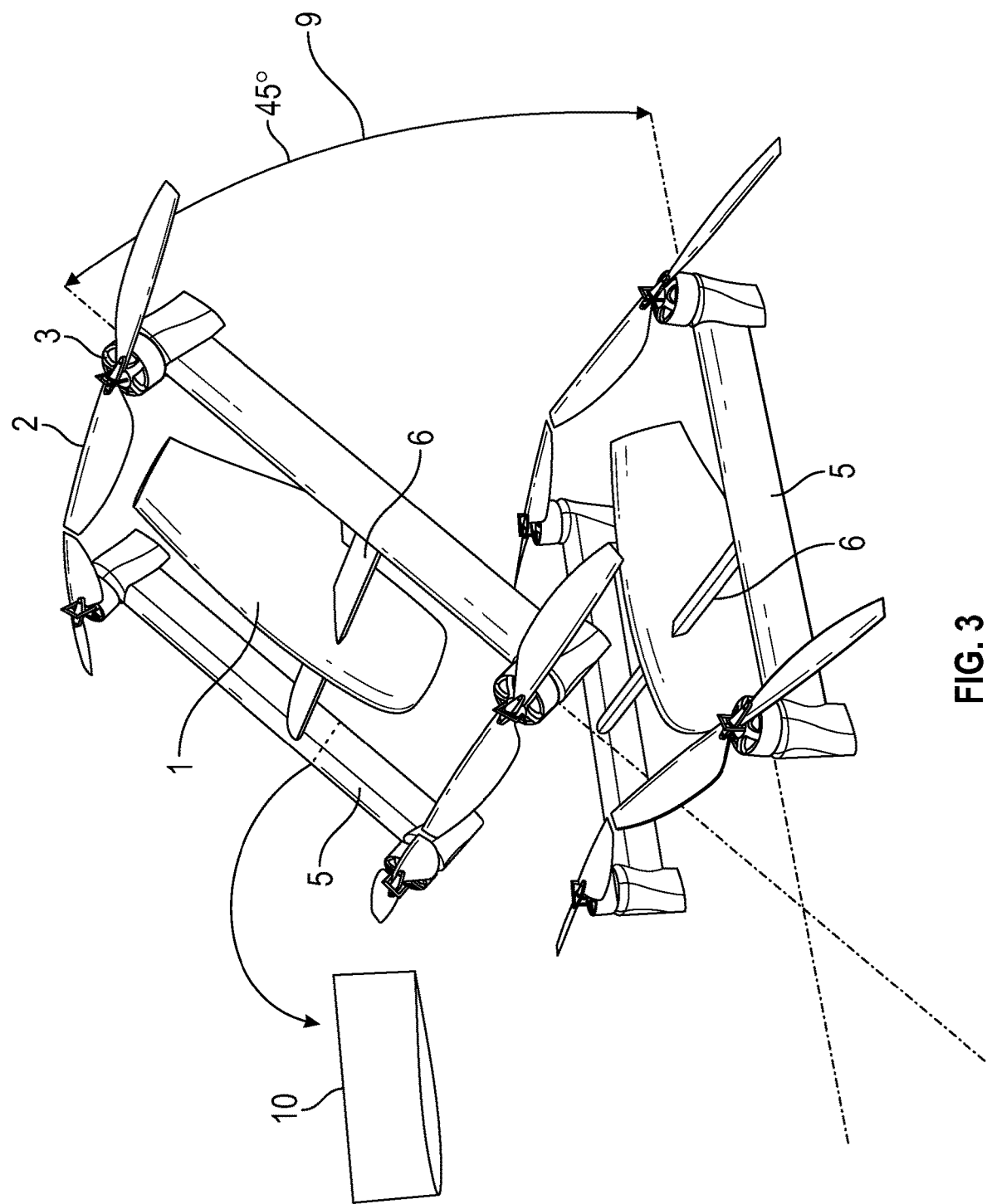
FIG. 3 is a perspective view of a drone with the basic components of the invention showing an embodiment of the drone designed to fly at its most efficient profile when tilted forward by 45 degrees.

FIG. 3 is a perspective view of a drone with the basic components of the invention showing an embodiment of the drone designed to fly at its most efficient profile when tilted forward by 45 degrees. It can be seen that the fuselage 1 and the connecting arms 6 present a much more aerodynamic profile when moving (upper figure) than when hovering (lower figure). Note that while this drone, and the drone of FIG. 29, both look somewhat un-aerodynamic when sitting on the ground, or in a hovering position, but once they tilt forward the drone presents the airfoil profile that is was built for, such that it performs at maximum efficiency at this angle of forward tilt. In this case, the air resistance profile 10 was taken off a cross section of the propeller support arm 5, showing how the propeller support arm 5 presents a better aerodynamic profile when the drone is moving forward than when it is hovering.

Figure 4:
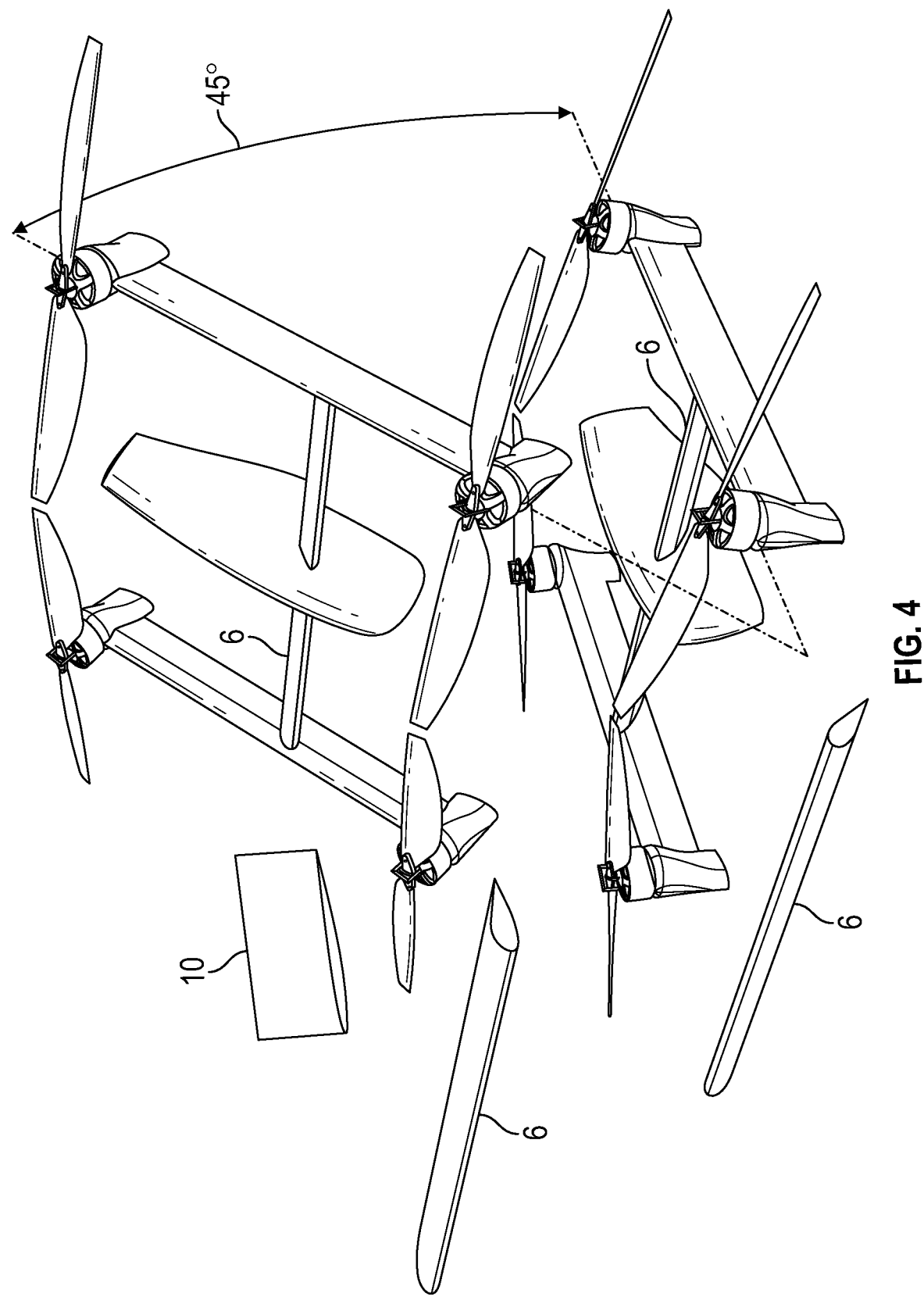
FIG. 4 is a slightly different perspective view of a drone with the basic components of the invention showing an embodiment of the drone designed to fly at its most efficient profile when tilted forward by 45 degrees, showing how the aerodynamic profile of the connecting arms varies substantially depending on whether the drone is hovering or moving forward.

FIG. 4 is a slightly different perspective view of the drone illustrated in FIG. 3, showing how the aerodynamic profile of the connecting arms varies substantially depending on whether the drone is hovering or moving forward. The connecting arms 6 in the lower figure (hovering) present a 45-degree profile, while those in the flying mode (upper figure) present a more aerodynamic profile, similar to an airplane wing.

Figure 5:
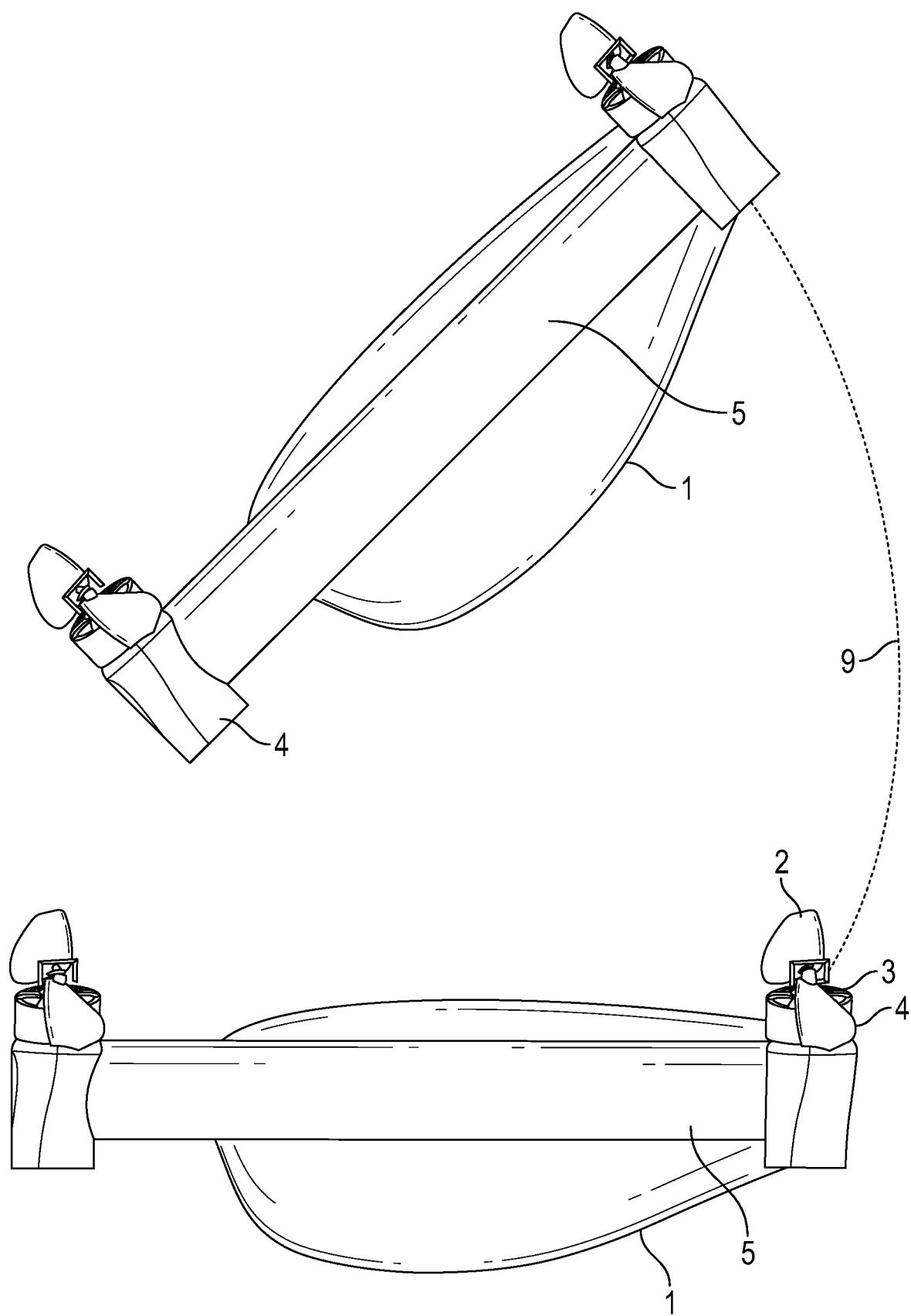
FIG. 5 is a side, perspective view of an aerodynamic drone at both "hovering" and "moving" positions.

FIG. 5 is a side, perspective view of an aerodynamic drone at both "hovering" and "moving" positions. As can be seen, the fuselage 1, propeller support arms 5, and motor mounts 4 are all more aerodynamically efficient when flying (upper figure) than when hovering (lower figure). The degree of inclination 9 can vary depending on the drone and the purpose for which it is intended. For example, a drone that is designed to fly very fast over long distances without the need to take photographs or video, such as package delivery or emergency responses, may be designed with a higher degree of inclination 9 than would a drone that was designed to fly around an object and take high quality photos (as with ground photography, pictures and video from drones is more stable the less the drone is moving when taking the pictures).

Figure 6:
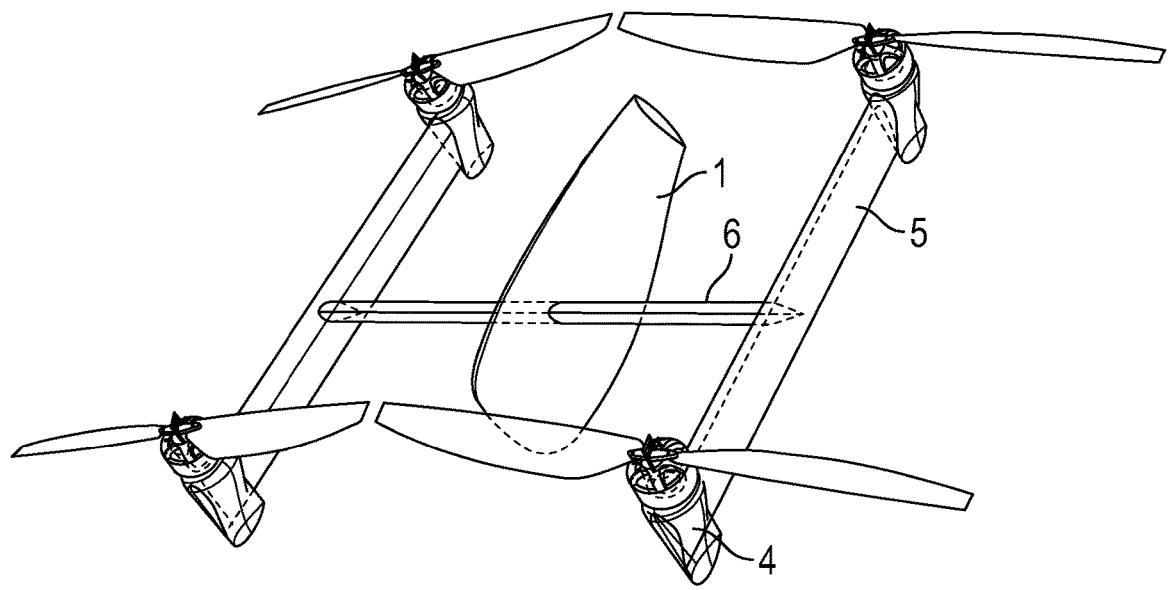
FIG. 6 is a side, perspective view of an aerodynamic drone at "moving" position.

FIG. 6 is a side, perspective view of an aerodynamic drone at "moving" position. Note how the connecting arms 6 are aligned in an aerodynamically ideal position once the drone has tilted forward, and how the propeller support arms 5 are high enough to provide support to the motor mounts 4, and yet thin enough to slice through the air as the drone is moving forward. Note too that the propeller mounts 4 are designed to present an airfoil-like shape when the drone is moving forward.

Figure 7:
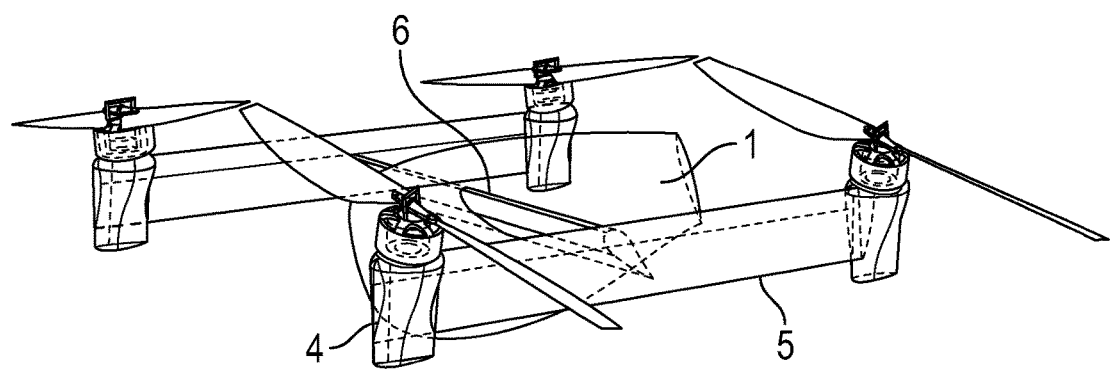
FIG. 7 is a side, perspective view of the drone illustrated in FIG. 6 at a "hovering" position.

FIG. 7 is a side, perspective view of the drone illustrated in FIG. 6 at a "hovering" position. Note how the connecting arms 6 are turned up at approximately at 45-degree angle, thereby presenting a much less aerodynamically efficient profile, than then the drone is flying forward as can be seen in FIG. 6.

Figure 8:
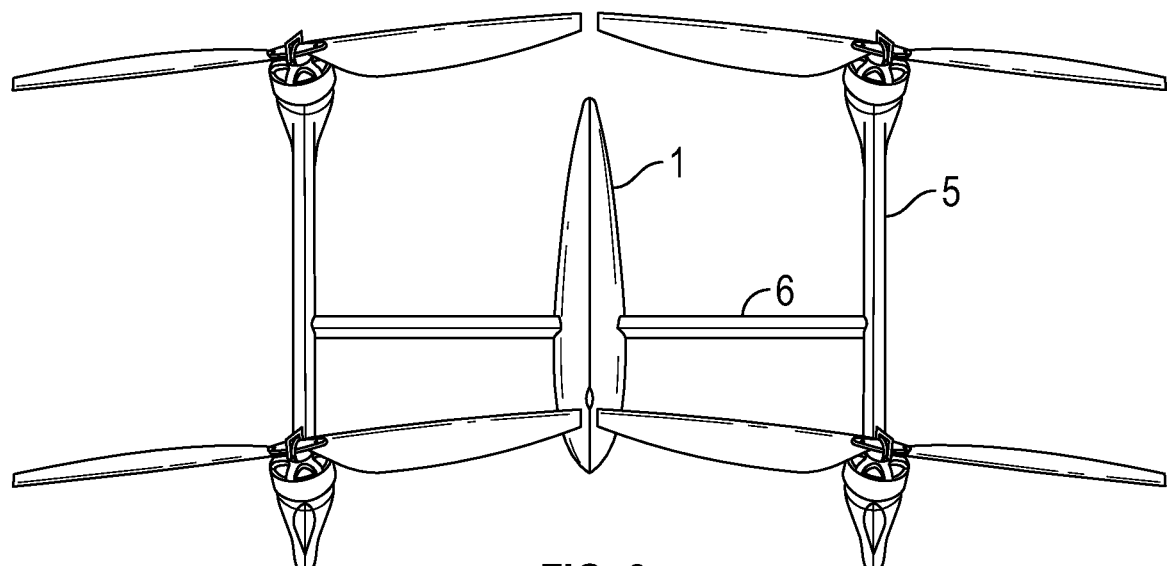
FIG. 8 is a top, perspective view of a drone showing the aerodynamic profile presented at a moving angle of attack.

FIG. 8 is a top, perspective view of a drone showing the aerodynamic profile presented at a moving angle of attack. This figure shows how the fuselage 1, connecting arms 6, propeller support arms 5, and motor mounts 4 are all designed and angled on the drone such that they present a minimum of aerodynamic drag when the drone is flying forward.

Figure 9:
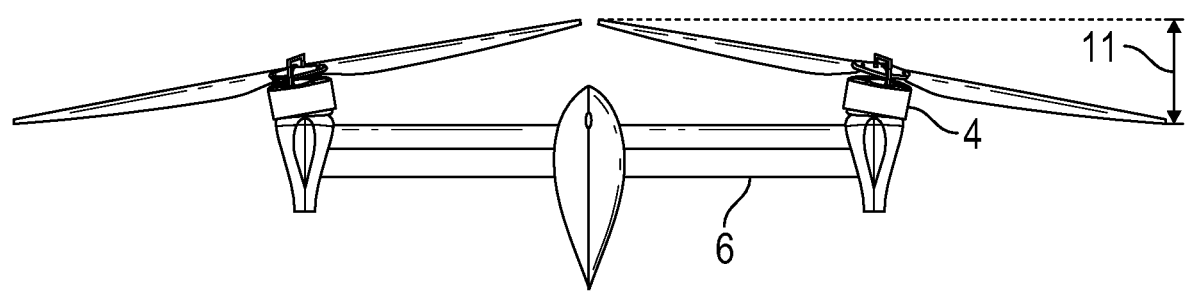
FIG. 9 is back view of the drone shown in FIG. 8, showing the aerodynamic profile presented at a hovering angle of attack.

FIG. 9 is back view of the drone shown in FIG. 8, showing the significantly poorer aerodynamic profile presented at a hovering angle of attack. The connecting arms 6 in particular are not nearly as well aligned to slice through the air as they are in FIG. 8, and the motor mounts 4 are also more efficient when flying.

Figure 10:
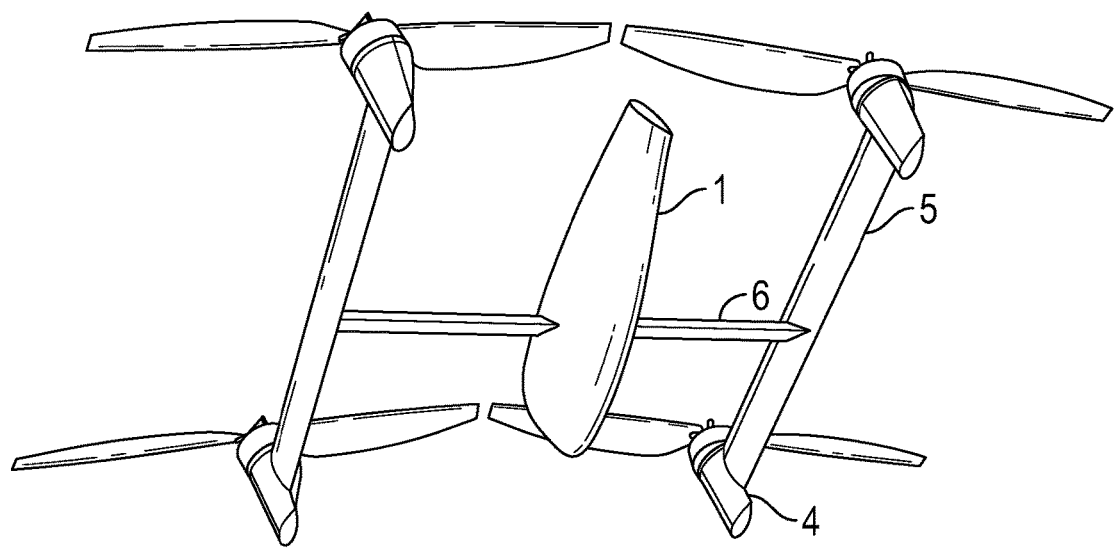
FIG. 10 is a bottom perspective of a drone moving forward, presenting an aerodynamic profile as it moves through the air.

FIG. 10 is a bottom perspective of a drone moving forward, presenting an aerodynamic profile as it moves through the air. The fuselage 1 is designed such that it presents a leading edge and a thin, trailing edge to aerodynamically slice through the air. The connecting arms 6, propeller support arms 5 and motor mounts 4 are all similarly designed, with a leading edge that tapers back to a thinner trailing edge that facilitates the drone moving through the air in a manner very similar to how an airplane wing or tail fin moves through the air.

Figure 11:
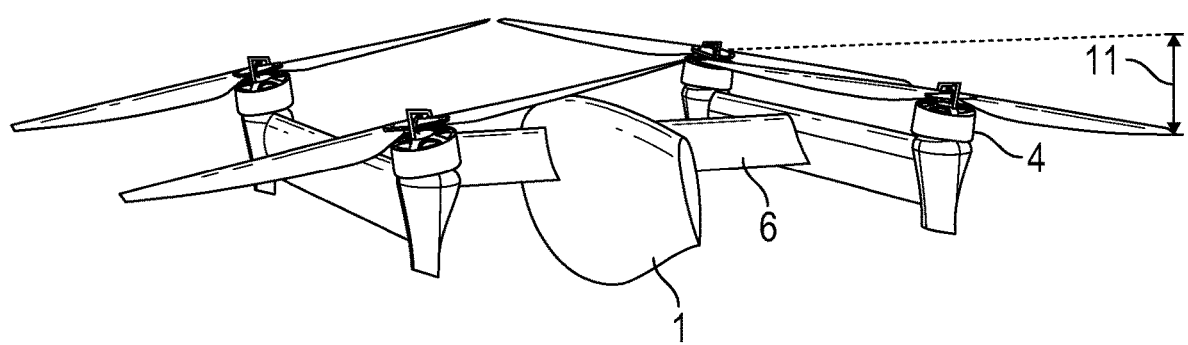
FIG. 11 is a back, perspective view of the drone illustrated in FIG. 10 in a hovering position.

FIG. 11 is a back, perspective view of the drone illustrated in FIG. 10 in a hovering position. While most drones have propellers that are parallel to the ground when the drone is in a resting position, the invention contemplates the use of tilted propellers 2, that have a propeller angle 11 by which their plane is offset to the ground.

Figure 12:
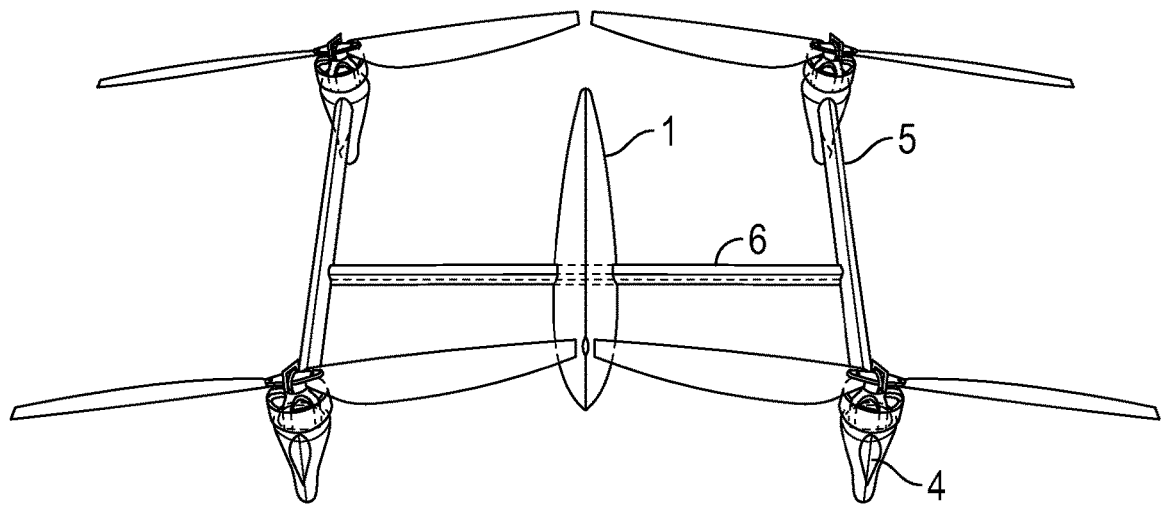
FIG. 12 is a top, perspective view of a drone presenting a low aerodynamic profile to the air as is moves forward.

FIG. 12 is a top, perspective view of a drone presenting a low aerodynamic profile to the air as is moves forward. This illustration shows how, particularly when compare with FIG. 13, which is the hovering position, the drone has its fuselage 1, connecting arms 6, propeller support arms 5 and motor mounts 4 aligned in an aerodynamic position while flying forward.

Figure 13:
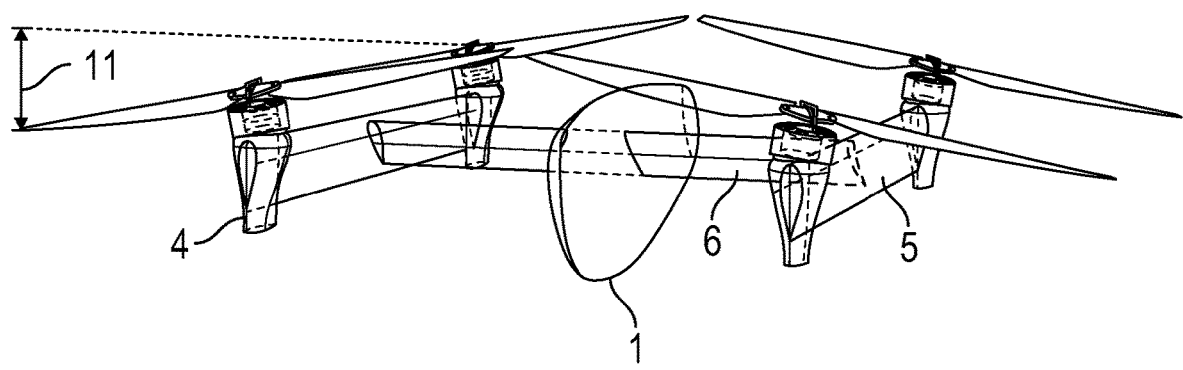
FIG. 13 is a front, perspective of the drone of FIG. 12 in a hovering position.

FIG. 13 is a front, perspective of the drone of FIG. 12 in a hovering position. Note how the motor mounts 4 present a flat, un-aerodynamic profile, and the connecting arms 6 are angled upward in an equally un-aerodynamic profile.

Figure 14:
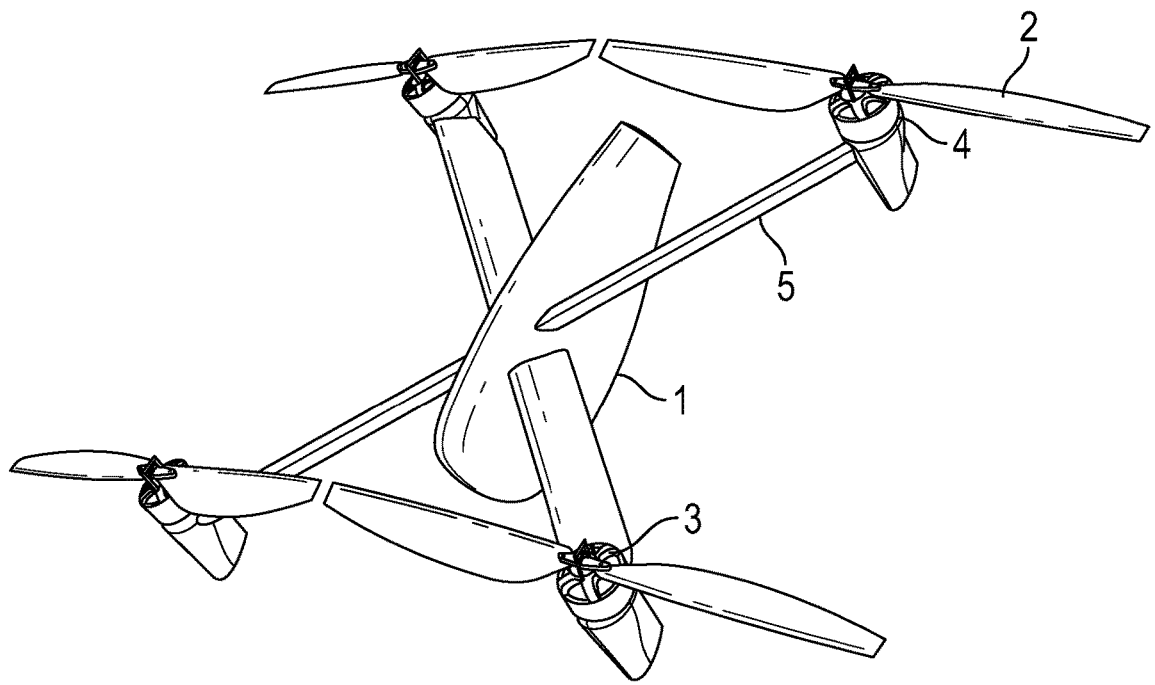
FIG. 14 is a front, perspective view of a drone with "X-shaped" connecting arms presenting a minimal aerodynamic profile while moving forward.
Figure 15:
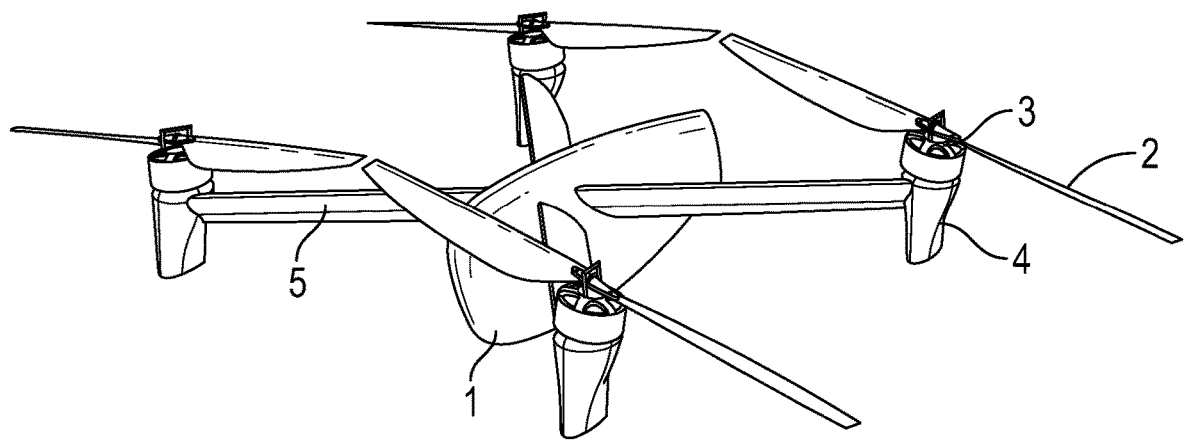
FIG. 15 is a front, perspective view of the drone illustrated in FIG. 16, presenting a less optimal aerodynamic profile while hovering.

FIG. 14 is a front, side, perspective view of a drone presenting an ideal aerodynamic profile while moving forward. In this embodiment, the drone's motor mounts 4 are connected to the fuselage 1 by four propeller support arms 5, arranged in an "X" configuration. It can be seen that the fuselage 1 and the connecting arms 5 present a much more aerodynamic profile when moving than when hovering, as is illustrated in FIG. 15. Because of the aerodynamic profile of the connecting arms 5 and their orientation, they can actually provide additional lift as the drone flies forward. The propeller support arms 5 are also very tall and thin, presenting another aerodynamically efficient profile when the drone is moving forward 8.

FIG. 15 is a side, perspective view of the drone shown in FIG. 14 in a hovering position. Note in particular the alignment of the propeller support arms 5.

Figure 16:
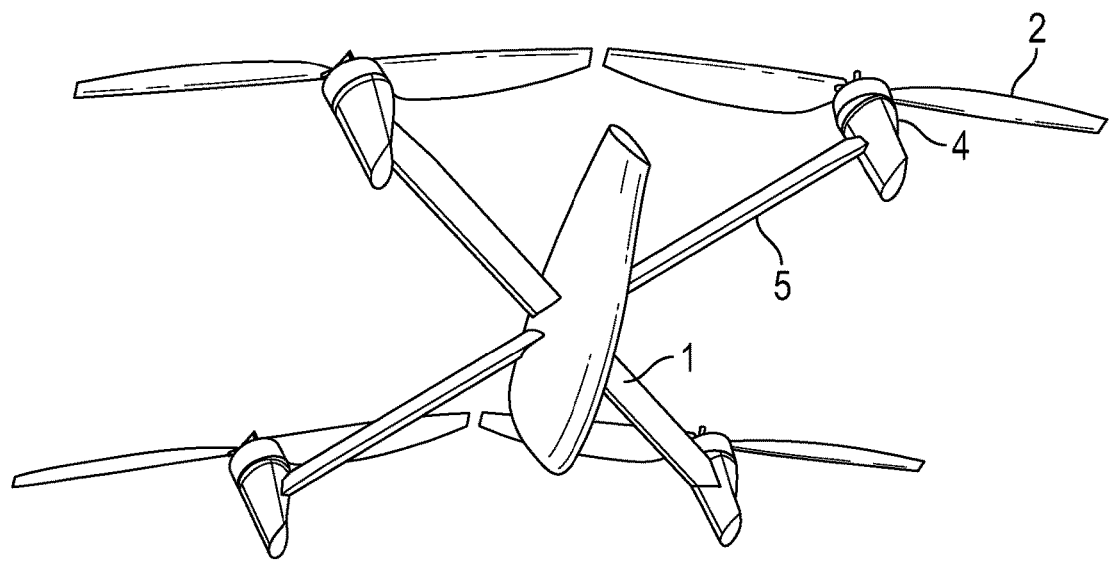
FIG. 16 is a bottom, perspective view of a drone with "X-shaped" connecting arms presenting a minimal aerodynamic profile while moving forward.

FIG. 16 is a bottom, perspective view of a drone with "X-shaped" connecting arms presenting a minimal aerodynamic profile while moving forward. The connecting arms 5 are angled to present a minimum surface area to the oncoming air.

Figure 17:
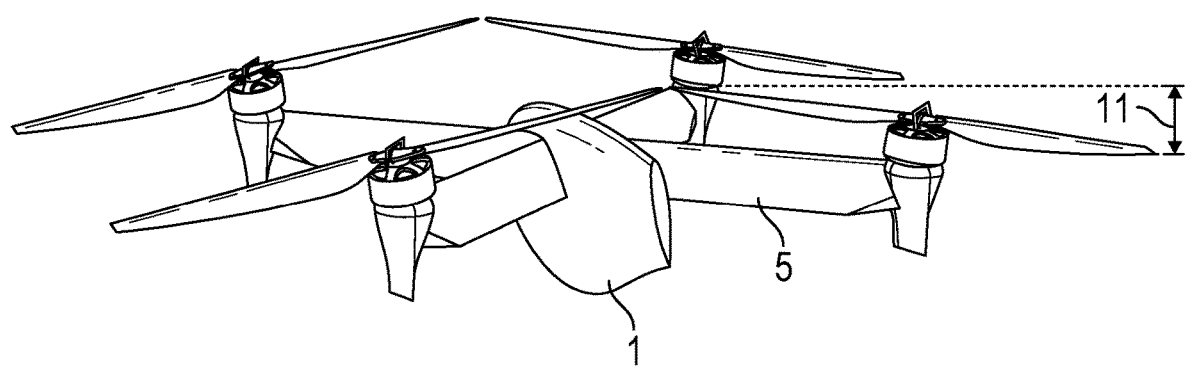
FIG. 17 is a back, perspective view of the drone illustrated in FIG. 18, presenting a less optimal aerodynamic profile while hovering.

FIG. 17 is a back, perspective view of the drone illustrated in FIG. 18, presenting a less optimal aerodynamic profile while hovering. Again, this is most pronounced in the large profile presented by the connecting arms 5.

FIG. 18 is a bottom, perspective view of a drone with "X-shaped" connecting arms 6, enlarged propeller support arms 5, a payload cavity 12, and a payload 13. Drones are currently used in two different ways: they carry a payload to accomplish a purpose, or they race. The payload 13 can range from a camera to a person, with the most common payloads being cameras or some sort of sensing device for use in building/bridge inspections or agriculture. The invention contemplates a payload cavity 12 into which a variety of payloads can be inserted. This figure also illustrated a drone with a tall and narrow fuselage 1, two thin connecting arms 6 and two propeller support arms 5 that become more aerodynamic when the drone is tilted forward when flying, and even an aerodynamically designed motor mount 4 that works more efficiently as the drone is tilted forward when flying. Payloads can have multiple items, such as the two cameras shown in this picture. The payloads can also include multiple sensors, such that a drone used for agricultural inspection may have a payload that includes a camera used for mapping along with a sensor that detects moisture in the ground, such when the data is retrieved, a farmer can quickly find areas that are over-watered and under-watered.

Figure 20:
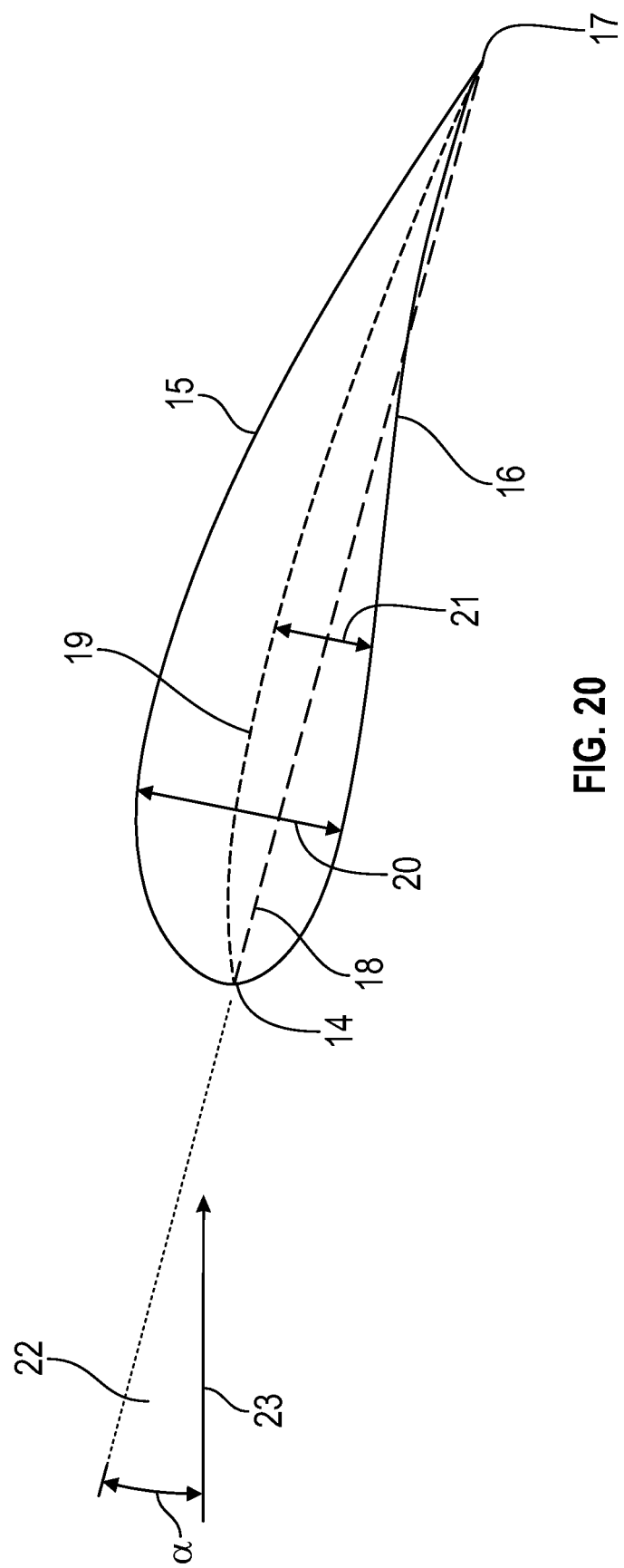
FIG. 20 is a cross-sectional view of an airfoil.

FIG. 19 is a back, perspective view of the drone illustrated in FIG. 20 in a hovering position.

FIG. 20 is a cross-sectional view of an airfoil. The airfoil has a leading edge 14, a trailing edge 17, an upper surface 15 and a lower surface 16. The leading edge 14 cuts through wind 23, and the airfoil is angled at an angle of attack 22 that is designed to maximize lift. The airfoil has a maximum thickness 20 and a maximum camber 21. A chord line 18 is the straight line between the leading edge 14 and the trailing edge 17, and the camber line 19 is the locus of points midway between the upper surface 15 and the lower surface 16. The shape of the camber line 16 varies depending on the design of the airfoil.

For use of an optimum design, the proper shape of an airfoil is selected, and then elevated or tilted to attack the oncoming wind at the proper angle of attack. The optimum design and the optimum angle of attack will vary depending on the purpose for which the airfoil it selected. It is contemplated that a wide variety of airfoils could be used for various parts of this invention, but the basic thrust is to improve upon the current non-aerodynamic drones and drone parts on the market today.

It should be understood that while the preferred embodiments of the invention are described in some detail herein, the present disclosure is made by way of example only and that variations and changes thereto are possible without departing from the subject matter coming within the scope of the following claims, and a reasonable equivalency thereof, which claims I regard as my invention.

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

REFERENCE NUMBERS USED

1. Fuselage
2. Propeller
3. Motor
4. Motor mount
5. Propeller Support arm
6. Connecting arm
7. Resting angle of attack
8. Moving angle of attack
9. Degrees of inclination
10. Air resistance profile
11. Propeller angle
12. Payload cavity
13. Payload
14. Leading edge
15. Upper surface
16. Lower surface
17. Trailing edge
18. Chord line
19. Camber line
20. Maximum thickness
21. Maximum camber
22. Angle of attack
23. Relative wind That which is claimed:

1. An aerial drone vehicle, comprising:
an aerodynamic fuselage located along a central longitudinal axis of the vehicle, the front leading edge of the fuselage aligned with the central longitudinal axis, and the lateral width of the fuselage shorter than its vertical height;
a left transverse wing connected to the left side of the fuselage and extending transversely away from the fuselage, said the left transverse wing comprising an aerodynamic airfoil where the left transverse wing angle of attack is tilted approximately 45 degrees up from the longitudinal axis;
a right transverse wing connected to the right side of the fuselage and extending transversely away from the fuselage, said right transverse wing comprising an aerodynamic airfoil where the right transverse wing angle of attack is the same as the left transverse wing angle of attack;
a left motor support arm mounted on the outer end of the left transverse wing and oriented substantially parallel to the fuselage, said left motor support arm comprising an aerodynamic airfoil with angle of attack approximately 90 degrees up from the lateral axis of the fuselage;
a right motor support arm mounted on the outer end of the right transverse wing and oriented substantially parallel to the fuselage, said right motor support arm comprising an aerodynamic airfoil with angle of attack approximately 90 degrees up from the lateral axis of the fuselage;
a fixed front left motor mount attached to the front longitudinal end of the left motor support arm, said fixed front left motor mount aligned with the left motor support arm angle of attack, said fixed front left motor mount comprising an aerodynamic airfoil;
a fixed front right motor mount attached to the front longitudinal end of the right motor support arm, said fixed front right motor mount aligned with the right motor support arm angle of attack, said fixed front right motor mount comprising an aerodynamic airfoil;
a fixed rear left motor mount attached to the rear longitudinal end of the left motor support arm, said fixed rear left motor mount aligned with the left motor support arm angle of attack, said fixed rear left motor mount comprising an aerodynamic airfoil;
a fixed rear right motor mount attached to the rear longitudinal end of the right motor support arm, said fixed rear right motor mount aligned with the right motor support arm angle of attack, said fixed rear right motor mount comprising an aerodynamic airfoil;
a front left motor attached to the top of the fixed front left motor mount such that the rotational axis of the front left motor is oriented generally upward and orthogonal to the left propeller support arm;
a front right motor attached to the top of the fixed front right motor mount such that the rotational axis of the front right motor is oriented generally upward and orthogonal to the left propeller support arm;
a rear left motor attached to the top of the fixed rear left motor mount such that the rotational axis of the rear left motor is oriented generally upward and orthogonal to the left propeller support arm;
a rear right motor attached to the top of the fixed rear right motor mount such that the rotational axis of the rear right motor is oriented generally upward and orthogonal to the left propeller support arm;
a front left propeller attached at the top of the front left motor;
a front right propeller attached at the top of the front right motor;
a rear left propeller attached at the top of the rear left motor; and
a rear right propeller attached at the top of the rear right motor.

* * * * *